Dec. 17, 1929.   W. G. KIRCHHOFF   1,740,024
DOUGH MOLDER
Filed Feb. 24, 1925   3 Sheets-Sheet 3
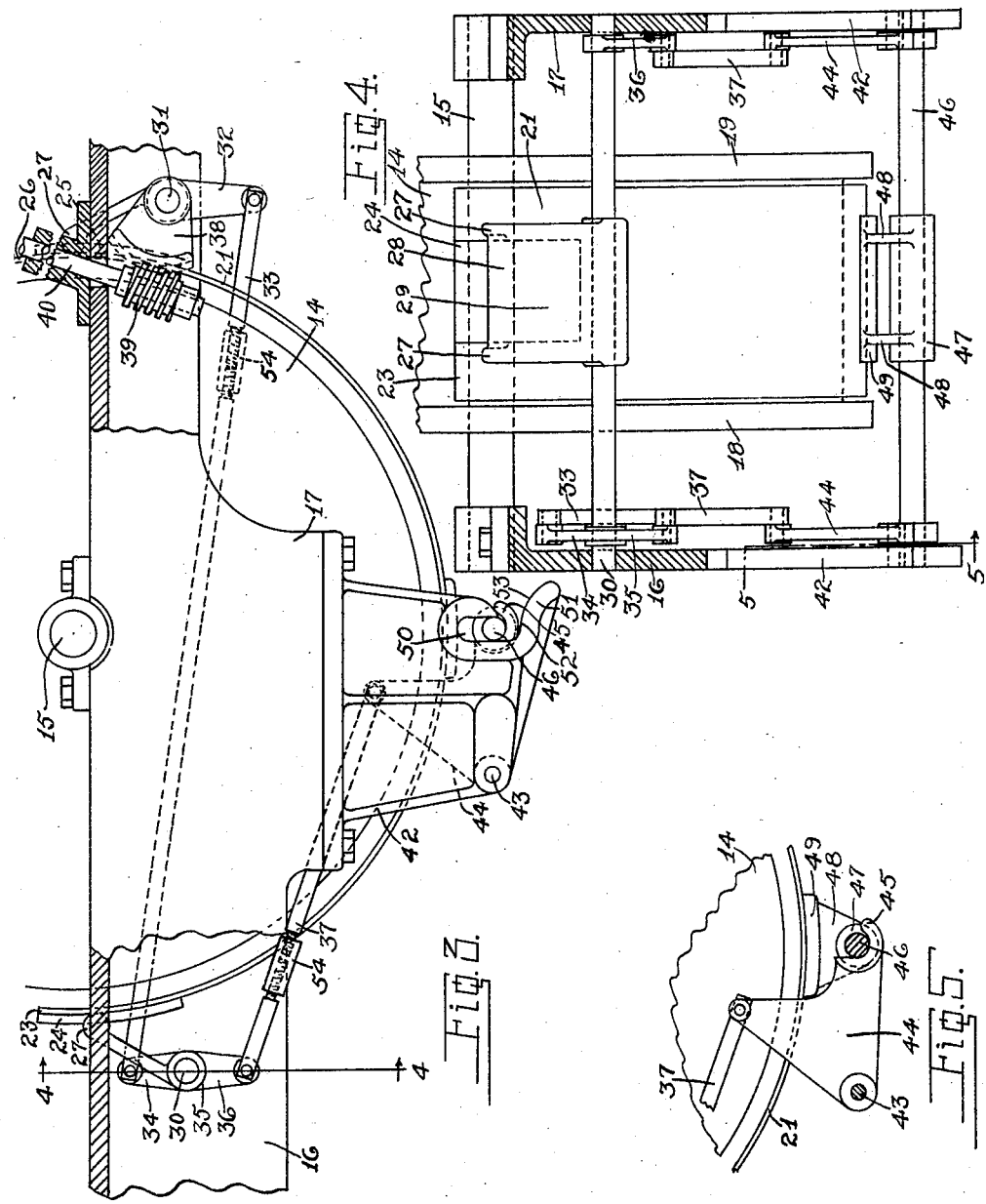
Inventor
William G. Kirchhoff,
By Murray & Gugelter
Attorneys Patented Dec. 17, 1929

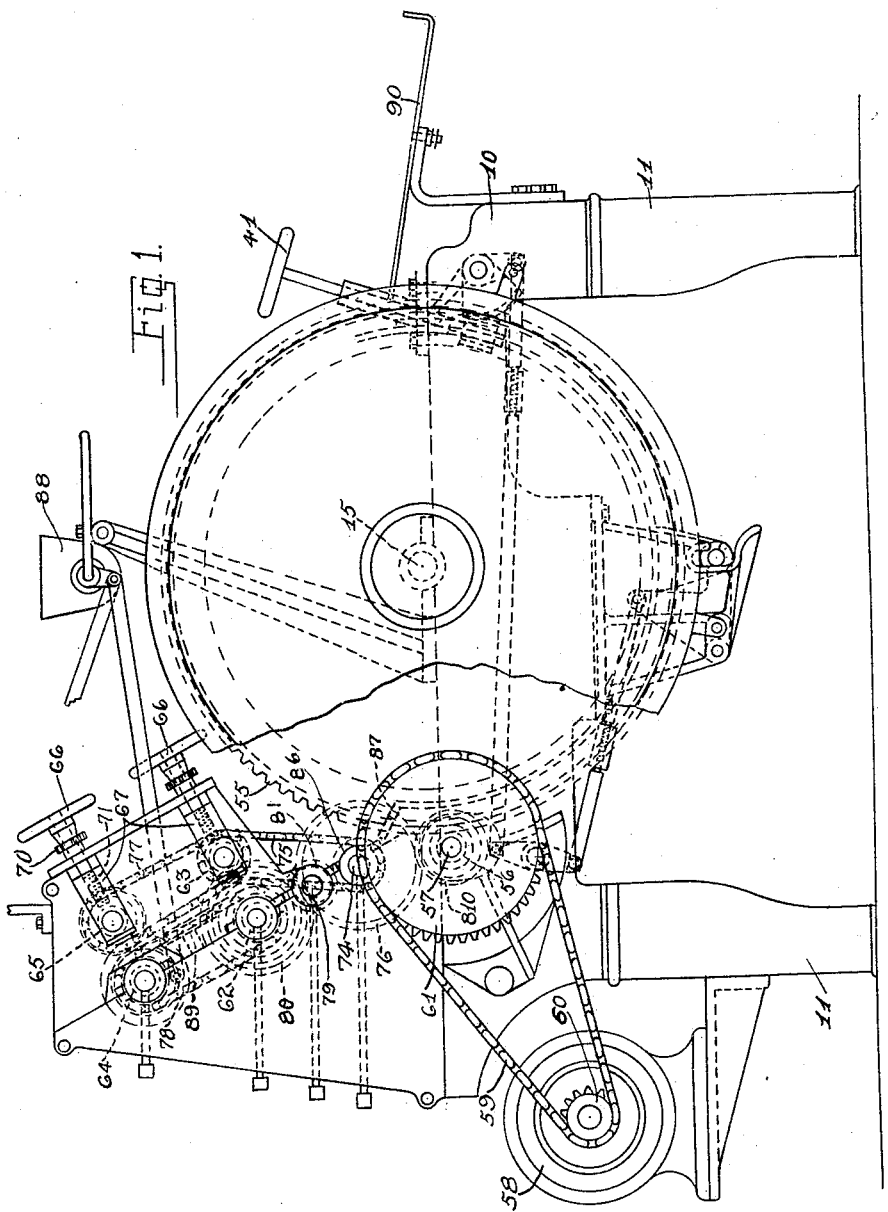

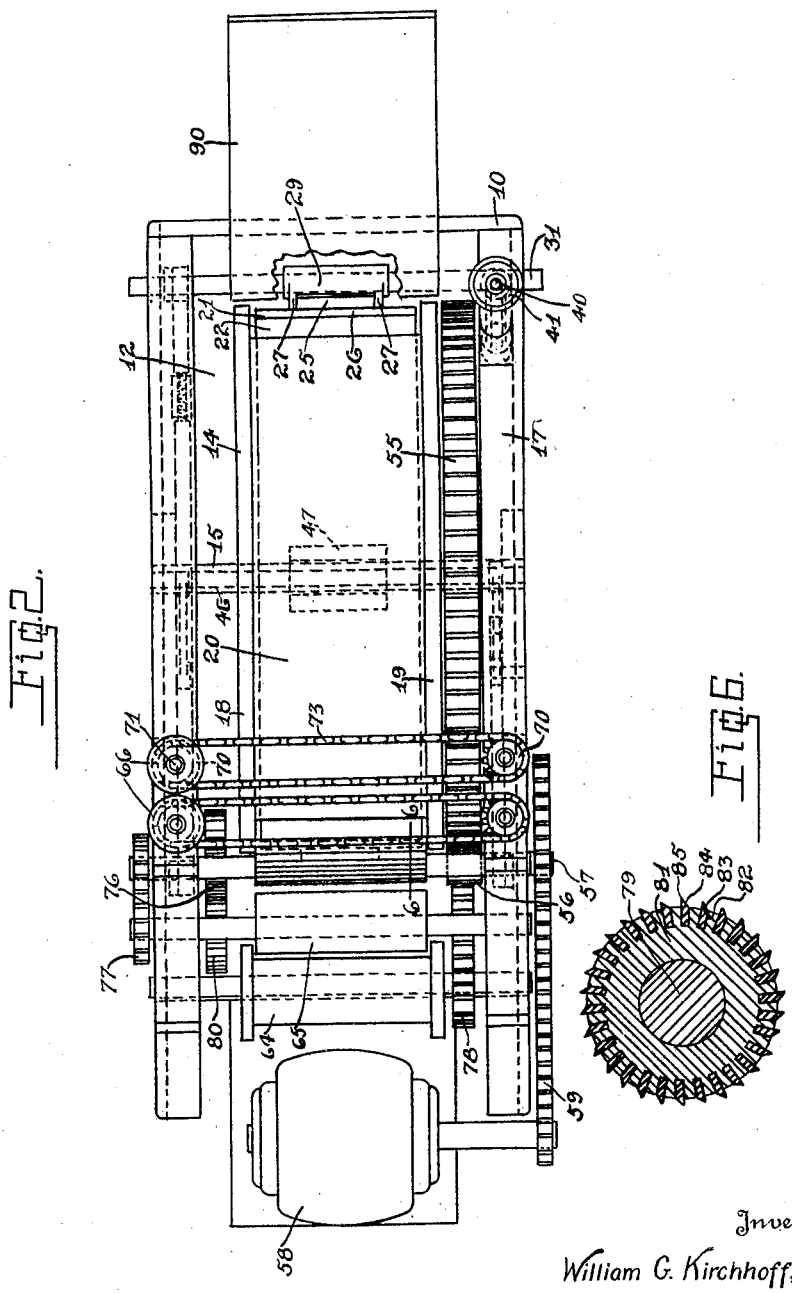

1,740,024

UNITED STATES PATENT OFFICE

WILLIAM G. KIRCHHOFF, OF CINCINNATI, OHIO, ASSIGNOR TO THE J. H. DAY COMPANY, OF CINCINNATI, OHIO, A CORPORATION OF OHIO

DOUGH MOLDER

Application filed February 24, 1925. Serial No. 11,086.

An object of my invention is to provide a dough molder having its parts so constructed and related that they may be assembled and disassociated by one attendant.

Another object of my invention is to provide a simple and efficient device for the purpose stated.

These and other objects are attained by the means described herein and disclosed in the accompanying drawings, in which:

Fig. 1 is a side elevation of a molder embodying my invention.

Fig. 2 is a plan view of the device shown in Fig. 1.

Fig. 3 is a fragmental side elevation, parts being shown in section.

Fig. 4 is a sectional view on line 4—4 of Fig. 3.

Fig. 5 is a sectional view on line 5—5 of Fig. 4.

Fig. 6 is an enlarged sectional view on line 6—6 of Fig. 2.

The frame 10 is provided with suitable legs 11 and with an opening 12 in its top 13. A revoluble drum 14 is supported in the opening 12 by means of an axial shaft 15 supported at its ends upon the sides 16 and 17 of the frame. The drum 14 is provided with peripheral flanges 18 and 19 whereby a circumferential way 20 is provided between the flanges 18 and 19. A pressure board 21 is adapted to enter the way 20 and to operate upon dough held between it and the walls of the way 20. The pressure board is adjustable relative to the axis of the drum whereby to modify the passage or channel 22 through which dough and the like passes as the drum is revolved. The means for adjustably mounting and actuating the pressure board is hereafter described. Attention is directed to Fig. 3. The forward end 23 of the pressure board 21 is provided with a substantially rectangular plate 24 upon its outer surface. A similar rectangular plate 25 is provided at the rear end 26 of the pressure board. The plate 24 is reciprocally received between a pair of globular heads 27 extending from opposite sides of the body 28 of a bracket 29 mounted on the shaft 30. The shaft 30 is adapted to be oscillated and is supported at its ends by the sides 16 and 17 of the frame 10. The globular heads 27 engage the pressure board and the oscillation of the bracket 29 serves to move the pressure board radially of the drum for adjusting the size of the passage 20. The plate 24 precludes lateral displacement of the pressure board. From the foregoing it will be readily evident that the pressure board may be vertically reciprocated and that the pressure board may be moved without any binding action between the bracket 29 and the pressure board or the plate 24 carried by the pressure board. A similar structure is provided at the rear end 26 of the pressure board for modifying the end of the way 22 disposed at said end of the pressure board and for receiving the plate 25 mounted at said end of the pressure board. The shaft 31, similar to shaft 30, has fixedly mounted upon it a crank 32 that is pivotally connected, by means of a link 33, with a crank arm 34 of the crank 35. The crank 35 is fixed upon the shaft 30 and carries a second crank arm 36 to which is pivotally connected a link 37, the purpose of which will be explained hereafter. The shaft 31 has fixedly mounted on it a worm wheel segment 38 that is engaged by a worm 39 carried by a shaft 40 mounted upon the frame. A suitable hand wheel 41 is provided for revolving the shaft 40 whereby to oscillate the worm wheel segment 38, shaft 31, the crank 32 and bracket 29.

The sides of the frame are provided with depending brackets 42 each carrying a pivot 43 and each of which pivots carries a triangular plate 44. Each of the plates is provided with an upwardly turned finger 45 that serves as a bearing to receive and support a transversely extending shaft 46 upon which shaft 46 is supported a collar 47. The collar is provided with upwardly extending brackets 48 supporting a plate 49. The plate 49 is secured upon the lower face of the pressure board at a place substantially mid-way of the ends of the pressure board. A vertical slot 50 is provided in each of the brackets 42 at such position that the fingers 45 of the triangular plates 44 when supporting the shaft 46 will co-operate with the walls of the slots 50 in supporting the shaft 46 and in precluding displacement of the shaft 46 lengthwise of the device. A downwardly turned lip 51 extends from the mouth 52 of each of the slots 50 and serves as a support over which the shaft 46 may ride for removing the shaft 46 and for mounting the shaft 46 in operative position. The plates 44 are controlled in their pivotal mounting about pivots 43 by means of links 37. The parts are so related that when the hand wheel 41 is actuated for moving the ends of the pressure board toward the center of the drum, the shaft 46 is also moved toward the center of the drum, and vice versa, thereby retaining the various portions of the pressure board in substantially uniform spaced relation to the drum throughout the length of such pressure board. Attention is called to the fact that the upper face 53 of the lip 51, at its highest point, or in other words at the bottom of the slot 50, provides an adequate support for the shaft 46 so that one man may expeditiously apply and remove the pressure board. Suitable turn buckle connections 54 are provided in the various links for effecting adjustment of the links longitudinally.

Motion is imparted to the drum by means of a gear 55 mounted upon the shaft 15 and driven from a gear 56 mounted on stationary shaft 57. The gear 56 is connected with sprocket 61 driven from the motor 58 by a chain 59 and sprocket 60. Dough is fed to the way 22 by means of pairs of co-operating rollers 62 and 63, and 64 and 65, all of which are driven from the motor 58 by suitable gears and chain and sprocket structures as disclosed in Fig. 1. The rollers 63 and 65 are adjustable toward and away from the rollers 62 and 64 respectively by suitable hand wheels 66 and screws associated therewith and controlling blocks 67 provided as bearings for the axles of the said rollers. The roller 65 is supported by a pair of blocks 67, and the pair of blocks are moved in unison whereby to retain the rollers in parallelism with their co-operating rollers, by means of sprockets 70 carried by screws 71 and chains 73 extending about the sprockets. The rollers 63 and 65 are independently adjustable by similar means. The roller 63 is positively driven from shaft 74 by means of a suitable sprocket and chain structure 75. Shaft 74 is driven by a gear 76 carried by shaft 74 and meshing with a gear 810 on shaft 57. Gear 810 is connected with gear 56. Roller 65 is driven from roller 63 by a suitable chain and sprocket structure 77. Roller 64 is driven from roller 62 by means of a sprocket and chain structure 78. Roller 62 is driven from shaft 74 by intermeshing gears 80 and 76. Curling roller shaft 79 is driven from roller 62 whereby to impart movement in a common direction to shafts 74 and 79. The shaft 79 has mounted on it a curling roller 81. The roller 81 has formed in it a plurality of radial grooves 82 in which are mounted hardened steel blades or vanes 83 having a tapered outer face 84 terminating upon an exposed point 85 at the outer end of the blade. The blades 84 are treated to make them very hard so that the roller may be cleansed by means of metallic scrapers without wearing down the sharp points 85 formed on the plates. A roller 86 mounted on shaft 74 cooperates with roller 81 in forming into a round mass or roll the sheet of dough discharged from co-operating rollers 62 and 63. When the end of a sheet of dough is discharged from between rollers 62 and 63, the roll of dough developed by rollers 81 and 86 falls upon or past the outwardly projecting flange 87 formed at the upper end of the pressure board 21 and is directly guided into the way 20. Suitable flouring devices such as 88 may be provided for flouring the drum and the various rollers.

In the operation of a device embodying my invention dough is introduced between the first pair of co-operating rollers 64 and 65 and is formed into a sheet that passes over a scraper or guide plate 89 to the second pair of co-operating rollers 62 and 63. The sheet formed by the passage of dough beyond the second pair of co-operating rollers engages the rollers 81 and 86, said rolls moving in a counter clock-wise direction, see Fig. 1. The action of the rolls 81 and 86 causes the dough sheet to be formed into a roll or round mass. Upon the discharge of the end of the sheet of dough from the second pair of co-operating rollers, the rolled mass of dough falls into the way 20 and is carried therethrough by the action of the drum in co-operation with the pressure board. The dough is discharged from the way 20 upon a suitable receiving table 90 from which an operator may remove same.

When it is desired to remove the pressure board for cleaning same, it is necessary only that the hand wheel 41 be revolved to permit the pressure board to assume its lowermost position with the shaft 46 engaging upon the lower walls of the slots 50 in the brackets 42 while the upwardly turned finger 45 is withdrawn from the mouth of the slot 50. Thereafter a single operator may move the pressure board downwardly and forwardly so as to disengage the shaft 46 from the bracket 42. At this time it should be noted that the devices provided for operation upon the upper ends of the pressure board are so constructed and function in such manner that there is no obstruction to the movement of the pressure board in the manner described. When it is desired to return the pressure board to its operative position a single operator may attend thereto. It is necessary only that the operator insert the shaft 46 into the slots 50, at the same time being careful to bring the upper ends of the pressure board into proper registration with the means operative upon said ends, whereupon the operator, by actuating the hand wheel 41, may bring the finger 45 of the plate 44 upwardly against shaft 46 thereby elevating shaft 46 into slot 50 and precluding dislodgment of the shaft 46 through the mouths of the slots 50. The size of the passage 22 may be adjusted by means of a hand wheel 41, the parts being so related so that as the lower portion of the pressure board is raised the pressure upon the upper ends of the pressure board may move such upper ends of the pressure board radially of the drum.

What I claim is:

1. In a device of the class described the combination of a frame, a drum revolubly supported by the frame, a pressure board for co-operation with the drum in providing a way through which plastics to be molded may be moved by the rotation of the drum, means for rigidly and removably mounting the board intermediate its ends upon the frame and comprising a slotted bracket, a shaft carried by the pressure board for entry into the slot in the bracket, and means for retaining the shaft in said slot.

2. In a device of the class described the combination of a frame, a drum revolubly supported by the frame, a pressure board for co-operation with the drum in providing a way through which plastics to be molded may be moved by the rotation of the drum, means for mounting the board upon the frame and comprising a slotted bracket, a shaft carried by the pressure board for entry into the slot in the bracket, means for retaining the shaft in said slot, and means for moving said retaining means lengthwise of the slot for moving the pressure board toward and away from the drum.

3. In a device of the class described the combination of a frame, a drum revolubly supported by the frame, a pressure board for co-operation with the drum in providing a way through which plastics to be molded may be moved by the rotation of the drum, means for rigidly mounting the board intermediate its ends upon the frame and comprising a slotted bracket, a shaft carried by the pressure board for entry into the slot in the bracket, means for retaining the shaft in said slot, and means for feeding rolls of dough to the way between the drum and the pressure board.

4. In a device of the class described the combination of a frame, a drum revolubly supported by the frame, a bracket mounted at each side of the frame, the brackets having aligned elongated slots, the slots extending substantially radially of the drum, the slots each having a mouth opening in a common direction and at one side of their respective brackets, a pressure board carrying a transversely extending shaft for entry through the mouths into the elongated slots in the brackets, and means for supporting the ends of the shaft at various positions lengthwise of the slot and precluding discharge of the shaft from the slot.

5. In a device of the class described the combination of a frame, a drum revolubly supported by the frame, a bracket mounted at each side of the frame, the brackets having aligned elongated slots, the slots extending substantially radially of the drum, the slots each having a mouth opening in a common direction and at one side of their respective brackets, a pressure board carrying a transversely extending shaft for entry through the mouths into the elongated slots in the brackets, and means for retaining the shaft within the slots.

6. In a device of the class described the combination of a frame, a drum revolubly supported by the frame, a bracket mounted at each side of the frame, the brackets having aligned elongated slots, the slots extending substantially radially of the drum, the slots each having a mouth opening in a common direction and at one side of their respective brackets, a pressure board carrying a transversely extending shaft for entry through the mouths into the elongated slots in the brackets, means for retaining the shaft within the slots, and means for moving the retaining means lengthwise of the slot for moving the pressure board toward and away from the drum.

7. In a device of the class described the combination of a frame, a drum revolubly supported by the frame, a bracket mounted at each side of the frame, the brackets having aligned elongated slots, the slots extending substantially radially of the drum, the slots each having a mouth opening in a common direction and at one side of their respective brackets, a pressure board carrying a transversely extending shaft for entry through the mouths into the elongated slots in the brackets, means for retaining the shaft within the slots, the pressure board having ends disposed adjacent the drum, and means for moving the ends of the board toward and away from the drum in unison with the movement of the shaft.

8. In a device of the class described the combination of a frame, a drum revolubly supported by the frame, a pressure board for co-operation with the drum for providing a way through which plastic masses may be moved by rotation of the drum, the pressure board having ends for disposition adjacent the drum, each end being provided with a guide way, means for mounting the pressure board upon the frame and comprising oscillating brackets, one each mounted adjacent each end of the pressure board adapted to co-operate with guide ways provided at the ends of the pressure board, a shaft carried by the pressure board substantially at the middle thereof, the shaft extending transversely of the board, a pair of brackets carried by the frame for receiving the ends of the shaft, said brackets each having formed in them a longitudinally extending slot provided with a mouth, the mouths of the brackets opening in a common direction, the lower walls of the slots being adapted to receive and support the shaft, and means for retaining the shaft withing the slots in the last mentioned brackets.

9. In a device of the class described the combination of a frame, a drum revolubly supported by the frame, a pressure board for co-operation with the drum for providing a way through which plastic masses may be moved by rotation of the drum, the pressure board having ends for disposition adjacent the drum, each end being provided with a guide way, means for mounting the pressure board upon the frame and comprising oscillating brackets, one each mounted adjacent each end of the pressure board adapted to co-operate with the guide ways provided at the ends of the pressure board, a shaft carried by the pressure board substantially at the middle thereof, the shaft extending transversely of the board, a pair of brackets carried by the frame for receiving the ends of the shaft, said brackets each having formed in them a longitudinally extending slot provided with a mouth, the mouths of the brackets opening in a common direction, the lower walls of the slots being adapted to receive and support the shaft, means for retaining the shaft within the slots in the last mentioned brackets, the last mentioned means being adapted to support the shaft within the slots and to move the shaft lengthwise of the slot, and means for actuating said retaining means and the brackets extending into the ways at the ends of the pressure board in unison for modifying the distance between the drum and the pressure board.

10. In a device of the class described the combination of a frame, a drum revolubly mounted on the frame, a pressure board having ends and carrying a transversely extending shaft at substantially its center portion, the ends of the pressure board having guide ways extending lengthwise of the pressure board, a pair of pivotally mounted brackets each mounted on the frame, a drum extending between the brackets, the brackets being adapted to cooperate with the guide ways provided on the pressure board and to move the ends of the pressure board toward and away from the drum when actuated about their pivotal mountings, a pair of brackets formed on each side of the frame and each brackets being provided with an elongated slot, the slot being disposed on substantially the vertical diameter of the drum and each slot having a mouth, the mouths opening in a common direction, the lower walls of the slots being adapted to receive and support a transversely extending shaft carried by the pressureboard, a plate pivotally mounted on each bracket, and provided with a finger for receiving the shaft and for supporting the shaft within the elongated slots, and means connecting the plate and the brackets disposed at the ends of the pressure board for moving the plate and said brackets about their respective pivotal mountings for moving the pressure board in substantial concentricity with the drum, toward and away from the drum, the fingers on the plates being adapted to preclude removal of the shaft from the elongated slots by way of the mouths thereof when the shaft is supported by said fingers.

In testimony whereof, I have hereunto subscribed my name this 20th day of February, 1925.

WILLIAM G. KIRCHHOFF.